United States Patent
Goggin

(10) Patent No.: US 10,826,077 B1
(45) Date of Patent: Nov. 3, 2020

(54) HYBRID SOLID FUEL BATTERY WITH REDUCED POWER GENERATION COSTS

(71) Applicant: Christopher Marshall Goggin, Boulder City, NV (US)

(72) Inventor: Christopher Marshall Goggin, Boulder City, NV (US)

( * ) Notice: Subject to any disclaimer, the term of this patent is extended or adjusted under 35 U.S.C. 154(b) by 87 days.

(21) Appl. No.: 16/253,089

(22) Filed: Jan. 21, 2019

Related U.S. Application Data

(60) Provisional application No. 62/620,338, filed on Jan. 22, 2018.

(51) Int. Cl.
| | |
|---|---|
| *H01M 6/02* | (2006.01) |
| *H01M 6/04* | (2006.01) |
| *H01M 6/50* | (2006.01) |
| *H01M 4/38* | (2006.01) |
| *H01M 8/04746* | (2016.01) |
| *H01M 8/04186* | (2016.01) |
| *H01M 8/04276* | (2016.01) |

(52) U.S. Cl.
CPC ............... *H01M 6/02* (2013.01); *H01M 6/04* (2013.01); *H01M 6/50* (2013.01); *H01M 4/38* (2013.01); *H01M 8/04186* (2013.01); *H01M 8/04276* (2013.01); *H01M 8/04753* (2013.01)

(58) Field of Classification Search
CPC ......... H01M 12/00–06; H01M 2/0452; H01M 2/0255; H01M 6/02; H01M 6/04; H01M 6/50

See application file for complete search history.

(56) References Cited

U.S. PATENT DOCUMENTS

2014/0255734 A1* 9/2014 Tennessen .............. H01M 8/20
429/51

\* cited by examiner

*Primary Examiner* — Ula C Ruddock
*Assistant Examiner* — Armindo Carvalho, Jr.
(74) *Attorney, Agent, or Firm* — Plager Schack LLP; Mark H. Plager; Eric Liou

(57) ABSTRACT

A hybrid solid fuel battery system includes a power module having a module housing that stores reactive fuel plates, insulating separators and cathode rings. The reactive fuel plates are stacked together and electrically coupled together within the module housing. Each reactive fuel plate is partially covered by a non-reactive layer to form an exposed bottom portion. Each reactive fuel plate in the power module is separated from an adjacent reactive fuel plate by one of the insulating separators. Each cathode ring is secured around one of the reactive fuel plates within the module housing. A container storing an electrolyte solution is connected to the power module by a pipe. A controller connected to the container permits the electrolyte solution to flow to the interior of the module housing. This facilitates an interaction between the electrolyte solution and exposed bottom portions of the stacked reactive fuel plates, thereby generating electrical power.

10 Claims, 5 Drawing Sheets

HYBRID SOLID FUEL BATTERY WITH REDUCED POWER GENERATION COSTS

RELATED APPLICATION

The application claims priority to provisional patent application U.S. Ser. No. 62/620,338 filed on Jan. 22, 2018, the entire contents of which is herein incorporated by reference.

BACKGROUND

The embodiments herein relate generally to electrical power storage devices. More specifically, embodiments of the invention relate to a hybrid solid fuel battery with reduced power generation costs that is refuelable and electrically rechargeable.

There exists a variety of electrical power storage devices on the market. Lithium batteries are popular but expensive (upwards of $100/Watt), are not recyclable at the present time and potentially dangerous to use or re-charge. These batteries can catch fire or explode, which make them problematic for shipping on aircraft or other vehicles. Further, lithium batteries are complex in that they require a BMS System (Battery Management System) to charge and monitor. Lithium batteries are also undesirable because they require long recharge cycles that may last 8 hours or more.

Lead acid batteries use caustic acids and lead plates that can be hazardous to health. More specifically, these batteries use lead and strong hydrochloric acid, which can outgas or cause lead poisoning in individuals. Further, lead acid batteries are heavy, require long recharge periods, and do not provide practical energy density for applications such as an electric vehicle's driving range. In addition, both lithium and lead acid batteries are undesirable because they suffer from internal leakage current, which limits their storage time before a re-charge is needed.

As such, there is a need in the industry for a hybrid solid fuel battery with enhanced safety and reduced power generation costs that addresses the limitations of the prior art. There is a further need for the hybrid solid fuel battery to be mechanically refuelable through the replacement of fuel plates or cartridges, and electrically rechargeable.

SUMMARY

In certain embodiments of the invention, a hybrid solid fuel battery system with reduced power generation cost that is refuelable and electrically rechargeable is provided. The battery system comprises a power module comprising a module housing that stores a plurality of reactive fuel plates, a plurality of insulating separators and a plurality of cathode rings, the plurality of reactive fuel plates stacked together and electrically coupled together in parallel within the module housing, each reactive fuel plate in the plurality of reactive fuel plates being partially covered by a non-reactive layer to form an exposed bottom portion in the reactive fuel plate, each reactive fuel plate in the power module separated from an adjacent reactive fuel plate in the plurality of reactive fuel plates by one of the plurality of insulating separators, each cathode ring in the plurality of cathode rings secured around one of the plurality of reactive fuel plates within the module housing, a container operably connected to the power module by a first pipe, an electrolyte solution stored within the container, and a controller operably connected to the container, wherein the controller permits the electrolyte solution in the container to flow through the first pipe to the interior of the module housing to facilitate an interaction between the electrolyte solution and exposed bottom portions of the stacked reactive fuel plates in the power module, thereby generating electrical power.

In certain embodiments of the invention, the hybrid solid fuel battery system comprises a main housing, a plurality of power modules disposed in the main housing and electrically coupled to each other in series, a container operably connected to the plurality of power modules by a first set of pipes, an electrolyte solution stored within the container, an air pump operably connected to the plurality of power modules by a second set of pipes, and a controller operably connected to the container and air pump, wherein the controller permits the electrolyte solution in the container to flow to the interiors of the plurality of module housings and enables the air pump to generate air bubbles that flow to the interiors of the plurality of module housings.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

In certain embodiments of the invention, the hybrid solid fuel battery system provides a safe electrical power storage device that can be both recharged and refueled with reduced power generation costs. In one embodiment, the hybrid solid fuel battery system can operate at approximately $0.03/kw-hr and generate electricity at a rate of approximately $10/Kilowatt.

Figure 1:
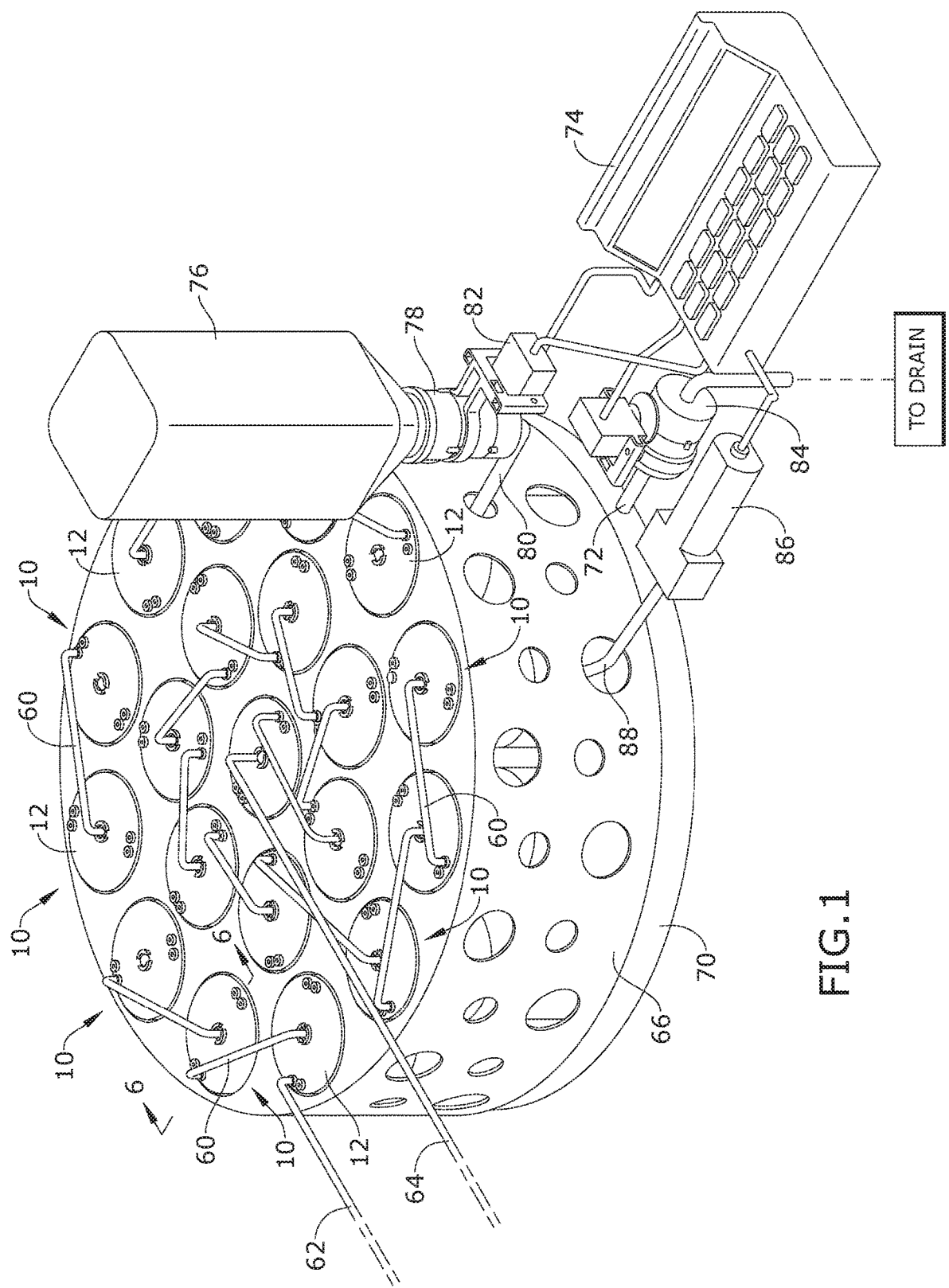
FIG. 1 depicts a perspective view of certain embodiments of the hybrid solid fuel battery system.
Figure 2:
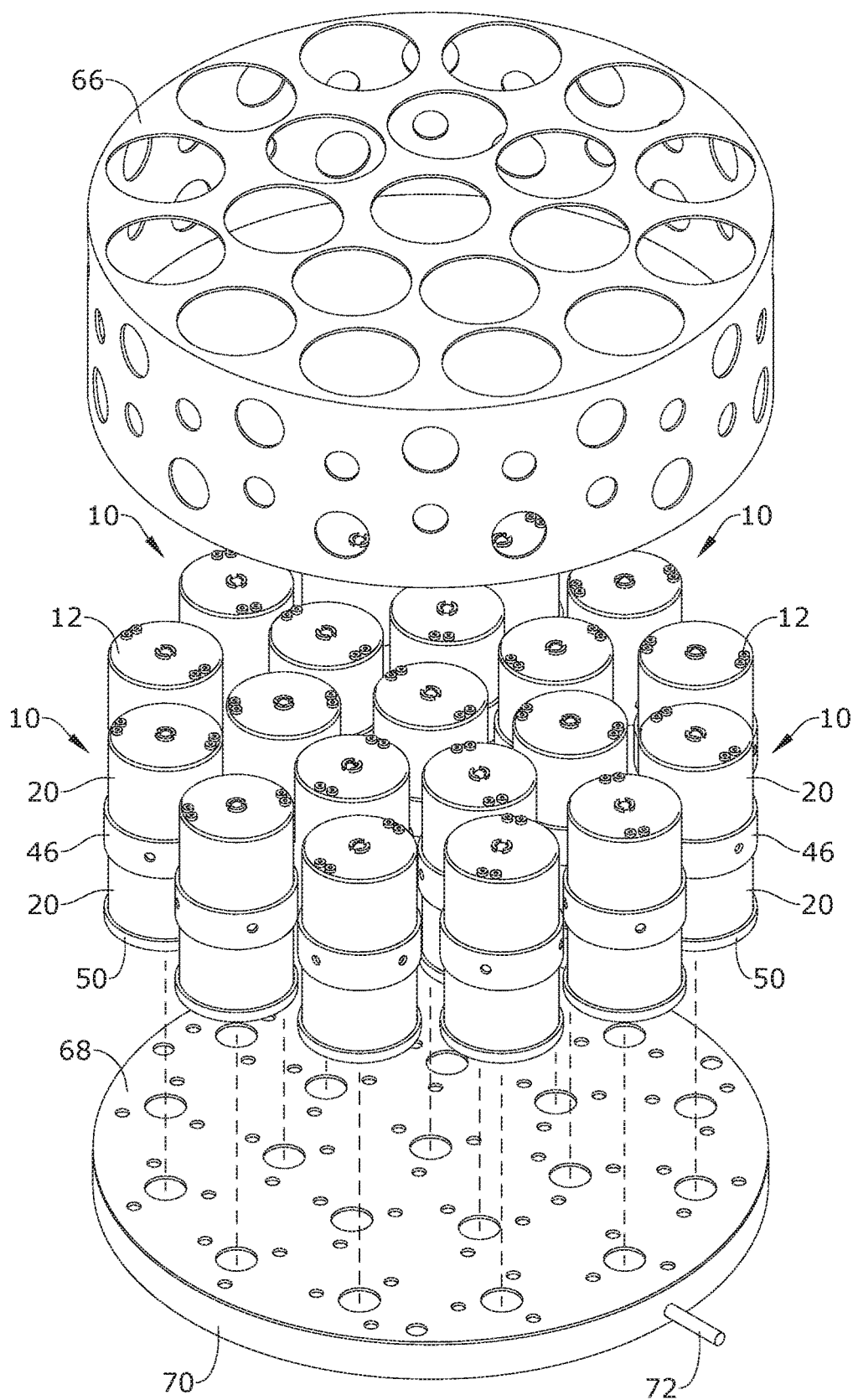
FIG. 2 depicts an exploded view of certain embodiments of the hybrid solid fuel battery system.

In certain embodiments of the invention as depicted in FIGS. 1-2, the hybrid solid fuel battery system generally comprises a plurality of power modules 10 operably connected to container 76 with an electrolyte solution, air pump 86 and process controller 74. Process controller 74 controls the flow of electrolyte solution from container 76 to power modules 10 and the operation of air pump 86 to generate air bubbles that are transported to power modules 10.

As will be described in more detail in the following disclosure, the interaction of the electrolyte solution with power modules 10 generates electrical power. In one embodiment, the hybrid solid fuel battery system described herein is rated at 1200 Watts. However, it shall be appreciated that the hybrid solid fuel battery system can be modified to achieve variable power specifications.

The plurality of power modules 10 are electrically coupled together in series by module connectors 60, which may include any components such as any type of conductive wiring, electrical connectors, and the like. The generated electrical power output from power modules 10 can be extracted from cathode connection member 62 and anode connection member 64. In one embodiment, the plurality of power modules 10 is disposed within a main housing comprising cover 66, base plate 68 and drain reservoir 70. Cover 66, base plate 68 and drain reservoir 70 may be made from materials including, but not limited to, carbon fiber, thermoset plastic, thermoplastics or other non-conductive materials.

Base plate 68 is coupled to the top of drain reservoir 70 and comprises a plurality of openings. Base plate 68 can be coupled to drain reservoir 70 by any mechanical fasteners, snap components, and the like. Cover 66 is disposed on base plate 68 and is configured to enclose power modules 10. In one embodiment, the top wall of cover 66 comprises openings to permit module connectors 60 to pass through. In one embodiment, cover 66 comprises any number of openings in the side wall.

Figure 3:
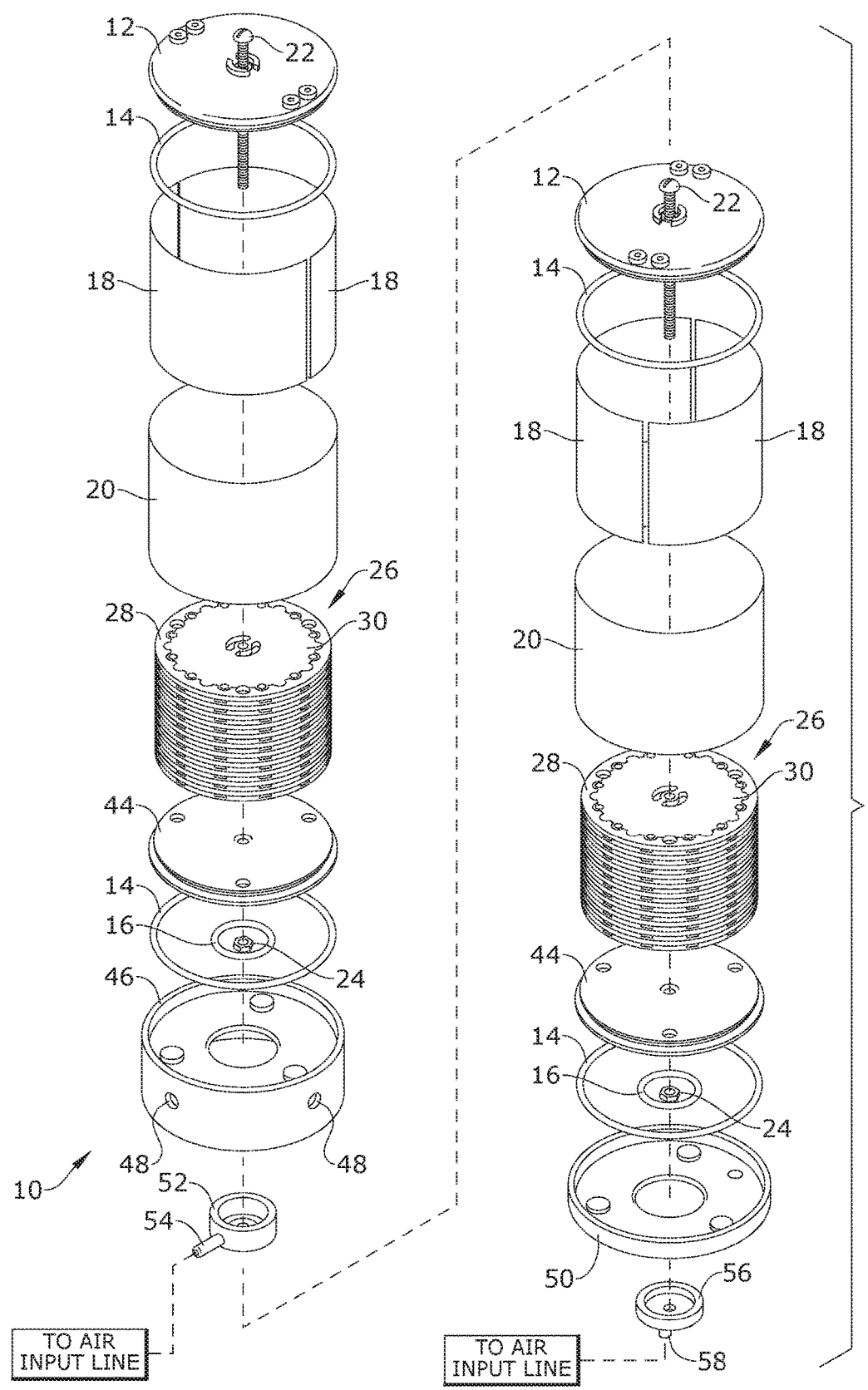
FIG. 3 depicts an exploded view of certain embodiments of the hybrid solid fuel battery system illustrating power module 10.
Figure 4:
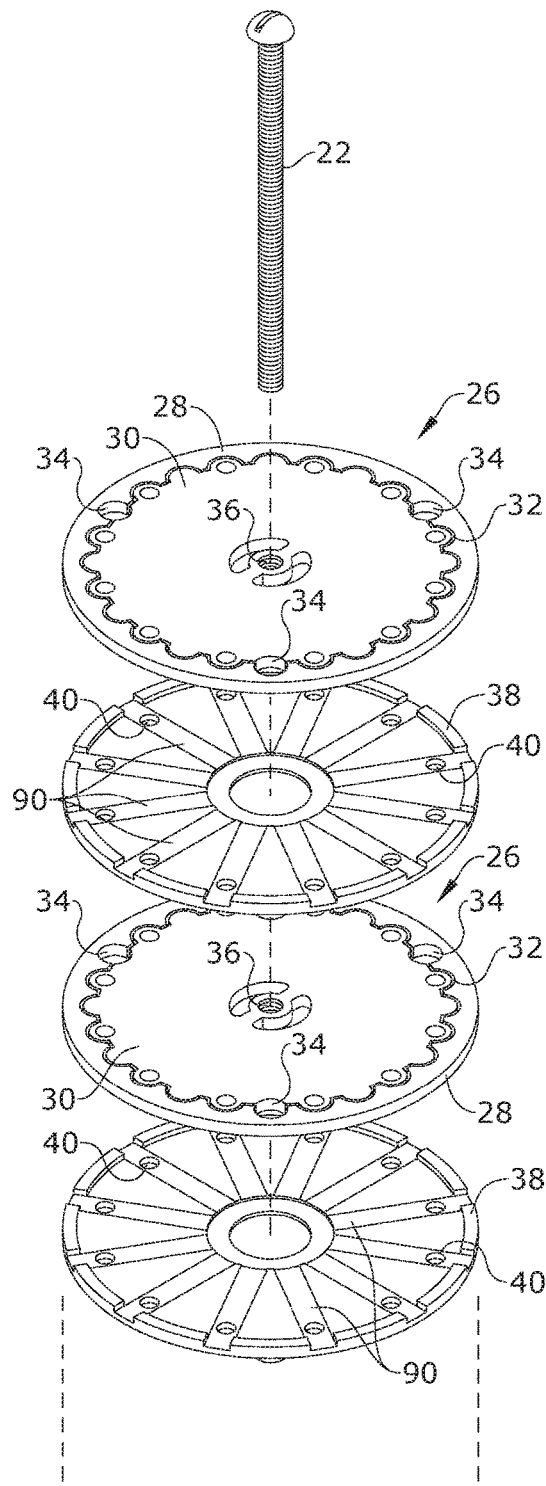
FIG. 4 depicts a top perspective partial exploded view of certain embodiments of the hybrid solid fuel battery system.
Figure 5:
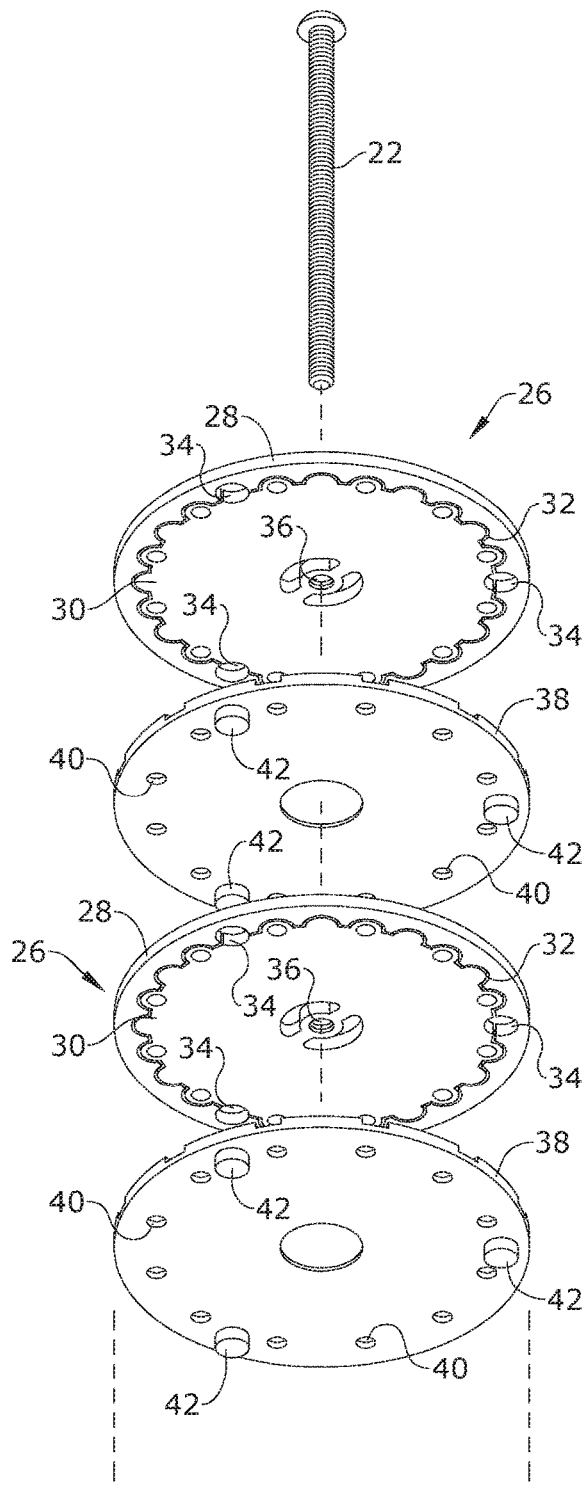
FIG. 5 depicts a bottom perspective partial exploded view of certain embodiments of the hybrid solid fuel battery system.

In certain embodiments as depicted in FIGS. 3-5, each power module 10 comprises a plurality of components stacked together including top cap 12, large O-rings 14, small O-rings 16, inner shell ring 18, outer shell ring 20, fuel plates 30, cathode rings 28, insulators 38, bottom caps 44, upper cup 52 and lower cup 56.

Figure 6:
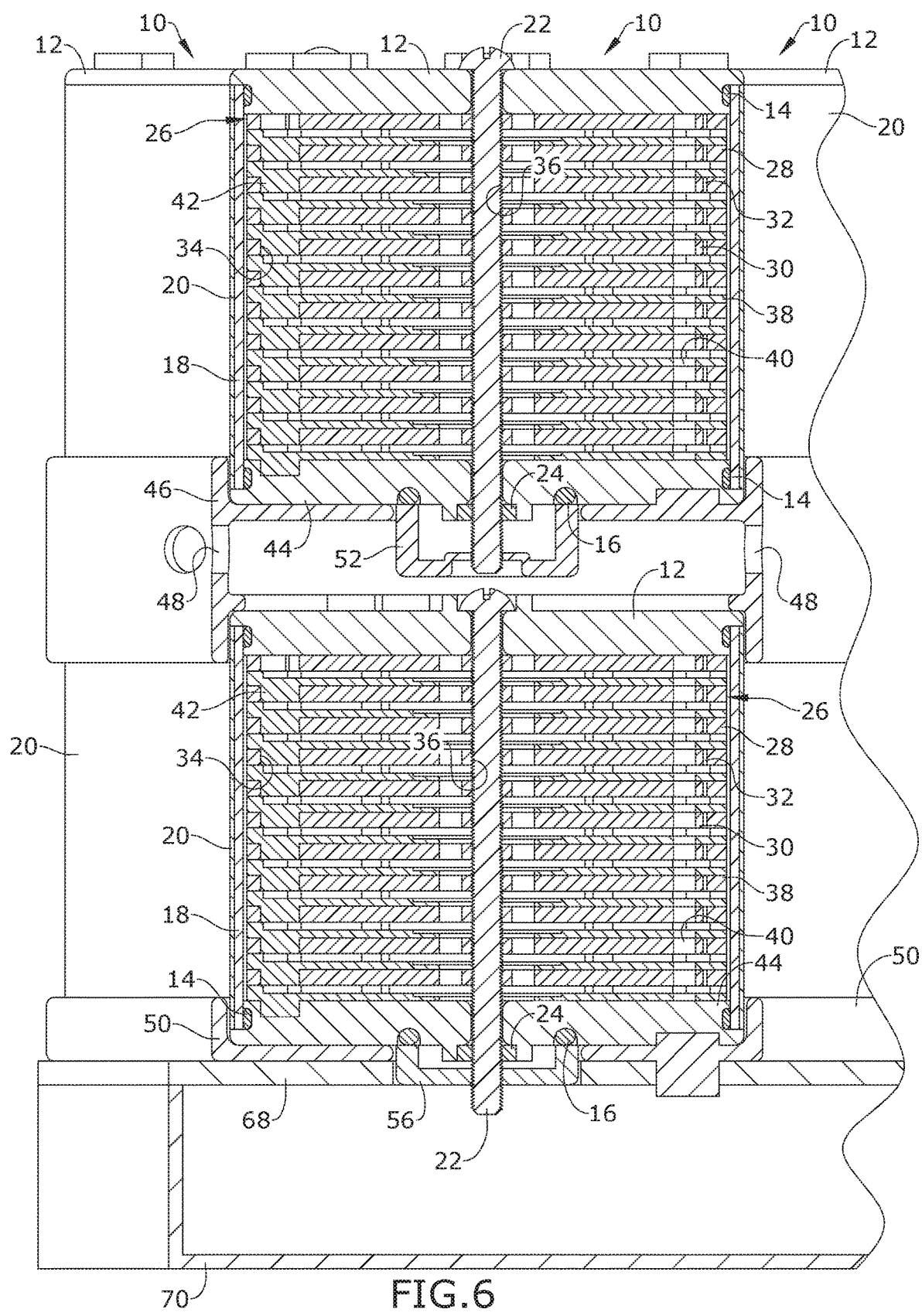
FIG. 6 depicts a section view of certain embodiments of the hybrid solid fuel battery system taken along line 6-6 in FIG. 1.

In certain embodiments as depicted in FIGS. 2-3 and 6, power module 10 preferably is a 60 W module rated at 10 Amps at 6V DC, and comprises an upper assembly electrically coupled to a lower assembly by series connector cap 46. As such, the components of the upper assembly of power module 10 including top cap 12, large O-rings 14, small O-ring 16, inner shell ring 18, outer shell ring 20, fuel plates 30, cathode rings 28, insulators 38, bottom cap 44 and upper cup 52 are coupled to series connector cap 46.

More specifically, series connector cap 46 is made from an ABS-Polycarbonate blend (50%-50%) thermoplastic and comprises a central opening and a plurality of air line connection ports 48. Upper cup 52 is disposed within the central opening of series connector cap 46 and comprises upper cup inlet 54, which is configured to extend through one of air line connection ports 48 in series connector cap 46. Upper cup inlet 54 is coupled to air pump 86 via air input pipe 88. As depicted in FIGS. 3 and 6, small O-ring 16 is disposed on upper cup 52 and large O-ring 14 is disposed on series connector cap 46 to prevent the leakage of any electrolyte solution present within power module 10. Large and small O-rings 14, 16 are made from silicone or other similar-type material.

Bottom cap 44 is disposed on large O-ring 14, small O-ring 16 and series connector cap 46, and is configured to support a plurality of fuel plates 30, cathode rings 28 and insulators 38 thereon. As depicted in FIGS. 3-6, the plurality of fuel plates 30, cathode rings 28 and insulators 38 are stacked together to form stacked fuel plate assembly 26 within the module housing. The module housing is formed by inner and outer shell rings 18, 20, top cap 12 and bottom cap 44.

In one embodiment, inner and outer shell rings 18, 20 are made from aluminum or another conductive material. In one embodiment, outer shell ring 20 can be used alone in power module 10 without inner shell ring 18. Top and bottom caps 12, 44 and upper cup 52 are made from any material including, but not limited to, carbon fiber, thermoset plastic, thermoplastics or other non-conductive materials. In order to enhance the seal within the module housing, another large O-ring 14 is secured between top cap 12 and inner shell ring 18.

In a preferred embodiment, a plurality of fuel plates 30 are stacked together with each fuel plate 30 separated from an adjacent fuel plate 30 by insulator 38. Each cathode ring 28 is secured around one of the plurality of fuel plates 30 within the module housing. Bolt 22 extends through the center portions of the stacked fuel plates 30 and insulators 38 along a longitudinal axis of the module housing. Bolt 22 is secured in place by nut 24.

Bolt 22 and nut 24 are preferably made from nickel plated brass or other similar-type materials. In one embodiment, bolt 22 is a 4-40 brass bolt that is nickel plated and configured to electrically couple the plurality of fuel plates 30 together in parallel. This allows the layers of stacked fuel plate assembly 26 on bolt 22 to build electrical charge while maintaining a constant voltage.

Each fuel plate 30 is a reactive fuel plate (anode) that is preferably made from aluminum. In alternative embodiments, it shall be appreciated that fuel plates 30 can be made from other reactive materials including, but not limited to, magnesium, sodium, lithium, iron or other metals capable of reacting with the electrolyte solution to create a dissolving-type reaction. Each fuel plate 30 comprises bolt hole 36 to receive bolt 22 therethrough. In one embodiment, a non-reactive layer is partially disposed around each fuel plate 30 to form an exposed bottom portion of fuel plate 30 that is negatively charged. The non-reactive layer is preferably made from nickel. However, the non-reactive layer can be made from other materials such as graphene, graphite or other materials.

In a preferred embodiment, each aluminum fuel plate 30 comprises a thickness of approximately 1/16" and a diameter of approximately 1½". However, the dimensions of fuel plates 30 can vary. Notably, variable thicknesses of fuel plates 30 can be used to alter the run time of the system. As an example, the exposed bottom portion of a 1/16" thick aluminum fuel plate 30 can interact with the electrolyte solution to produce electricity for approximately 5½ hours as used in embodiments of the invention. The exposed bottom portion of a 1/8" thick aluminum fuel plate 30 can produce electricity for approximately 11 hours as used in embodiments of the invention.

Each cathode ring 28 is secured around one of fuel plates 30. In a preferred embodiment, cathode rings 28 are made from nickel plated aluminum. However, alternative materials may be used instead. In one embodiment, cathode ring 28 and fuel plate 30 are separated by charge gap 32, which is preferably a distance of approximately 0.0125". In the secured position, each pair of cathode ring 28 and fuel plate 30 together form a plurality of alignment holes 34. In a preferred embodiment, three alignment holes 34 are formed and positioned 120 degrees apart from each other. However, an alternative number of alignment holes 34 can be formed by each pair of cathode ring 28 and fuel plate 30 in alternative embodiments.

Insulators 38 are preferably made from plastic or alternate non-conductive material, and are configured to separate adjacent fuel plates 30 in stacked fuel plate assembly 26. Each insulator 38 comprises a central opening to receive bolt 22, alignment posts 42 on the bottom surface, fluid return holes 40 and channels 90.

In certain embodiments as depicted in FIGS. 4-6, alignment posts 42 of insulator 38 engage with alignment holes 34 formed by a pair of cathode ring 28 and fuel plate 30. In a preferred embodiment, the plurality of channels 90 are arranged radially along the top surface of insulator 38. Fluid return holes 40 are disposed entirely through insulator 38 at channels 90.

In certain embodiments as depicted in FIGS. 3 and 6, the lower assembly of power module 10 is coupled to the bottom of series connector cap 46. The lower assembly of power module 10 comprises the same components as the upper assembly such as top cap 12, large O-rings 14, small O-ring 16, inner shell ring 18, outer shell ring 20, bolt 22, nut 24, fuel plates 30, cathode rings 28, insulators 38 and bottom cap 44, which are connected together in the same manner previously described.

The lower assembly of power module 10 further comprises bottom tray 50 and lower cup 56. Bottom tray 50 is coupled to bottom cap 44 and comprises a central opening configured to receive lower cup 56. Bolt 22 extends through lower cup 56 and is secured in place by nut 24. Bottom tray 50 and lower cup 56 are made from any material including, but not limited to, carbon fiber, thermoset plastic, thermoplastics or other non-conductive materials. Lower cup 56 comprises lower cup inlet 58, which is configured to be coupled to air pump 86 via air input pipe 88.

It shall be appreciated that any number of air input pipes 88 may be used in the hybrid solid fuel battery system to connect air pump 86 to the plurality of power modules 10. Air input pipes 88 can be connected to any number of air line connection ports 48 in power modules 10 as desired. In an alternative embodiment, any number of air pumps 86 can be connected to the hybrid solid fuel battery system as desired. In one embodiment, each air pump 86 is a 3V pump that is connected to a power source such as an external battery or power outlet (not shown).

In one embodiment as depicted in FIG. 1, container 76 is inverted and connected to container base 78. In a preferred embodiment, container 76 stores an electrolyte solution that is an approximately 3% peroxide and potassium hydroxide mixture. However, it shall be appreciated that embodiments of the invention may use different combinations of materials for fuel plates 30 and the electrolyte solution including at least: (1) Pure Aluminum (Al) Fuel Plate+Potassium Hydroxide (KOH) and 3% Peroxide ($H_2O_2$); (2) Pure Magnesium (Mg) Fuel Plate+Sodium Chloride (NaCl) and 3% Peroxide ($H_2O_2$)+1% Hydrochloric Acid (HCl); (3) Iron Fuel Plate (Fe)+Sodium Chloride (NaCl) and 3% Peroxide ($H_2O_2$)+0.5% Hydrochloric Acid (HCl); (4) Sodium (Na) Fuel Plate+Potassium Hydroxide (KOH)+3% Peroxide ($H_2O_2$); (5) Calcium Metal Fuel Plate+3% Peroxide ($H_2O_2$); (6) Cobalt Fuel Plate+Potassium Hydroxide (KOH)+Hydrochloric Acid (HCl)+3% Peroxide ($H_2O_2$); and (7) Beryllium-Copper Fuel Plate+3% Peroxide ($H_2O_2$)+Hydrochloric Acid (HCl).

Container 76 is coupled to electrolyte input pipe 80, which is connected to the plurality of power modules 10. It shall be appreciated that electrolyte input pipe 80 may be a network of any number of pipes used to connect container 76 to power modules 10.

Electrolyte servo valve 82 is operably connected to process controller 74 and container 76. Electrolyte servo valve 82 is configured to control the flow of electrolyte solution from container 76 to the interiors of power modules 10 via electrolyte input pipes 80. In one embodiment, drain outlet 72 is coupled to drain reservoir 70. Drain outlet 72 is operably connected to drain servo valve 84, which is operably connected to process controller 74.

In certain embodiments, the hybrid solid fuel battery system is process controlled with any TI, or National Semiconductor micro controller chips. In one embodiment, process controller 74 is a 64 Byte process controller. However, alternative types of process controllers may be used. Process controller 74 may comprise or be used with any number of electrical and computing components including, but not limited to, input devices, displays, circuits, processors, memory storage devices and computer-executable software or algorithms that can be programmed to control the operation of the hybrid solid fuel battery system including electrolyte servo valve 82, drain servo valve 84 and air pump 86.

In one embodiment, process controller 74 comprises a timer to monitor the fuel level state and determine the remaining lifespan of fuel plates 30 in power modules 10 based on current usage. In one embodiment, sensors can be operably connected to fuel plates 30 in power modules 10 and electrically coupled to process controller 74. In this embodiment, process controller 74 monitors the sensors to determine the remaining lifespan of fuel plates 30 in power modules 10.

In an exemplary operation, process controller 74 adjusts electrolyte servo valve 82 to permit the flow of the electrolyte solution from container 76 to the interior chambers of power modules 10 via electrolyte input pipes 80. The electrolyte solution within each power module 10 interacts with the exposed bottom portions of the stacked fuel plates 30 in a dissolving-type reaction to generate electrical power. In one embodiment, process controller 74 also enables air pump 86 to generate air bubbles that travel through air input pipes 88 to the interior chambers of power modules 10. The air bubbles within each power module 10 agitate the electrolyte solution within the module housing to enhance contact between the electrolyte solution and the exposed bottom portions of the stacked fuel plates 30. This increased movement of electrolyte solution within each power module 10 helps to facilitate a greater electrical power output. The plurality of power modules 10 perform this operation simultaneously to generate a total electrical power output that can be extracted for use from cathode connection member 62 and anode connection member 64.

The electrolyte solution waste from power modules 10 drains out of the bottom of the module housings for a collection in drain reservoir 70. During this process, electrolyte solution travels along channels 90 and directly through fluid return holes 40 in insulators 38 as the solution flows downward through stacked fuel plate assembly 26. In one embodiment, process controller 74 controls the operation of drain servo valve 84 to evacuate the electrolyte solution waste in drain reservoir 70 via drain outlet 72. The collected electrolyte solution waste can be recycled or disposed accordingly.

The hybrid solid fuel battery system has many advantages over prior art electrical power storage devices. The battery system has an unlimited number of recharge cycles and can be recharged in minutes rather than 8 hours or more. The materials used in the battery system are non-toxic and 100% recyclable. The hybrid solid fuel battery system provides a safe power solution that does not explode, catch fire or outgas, even if damaged or punctured.

It shall be appreciated that the hybrid solid fuel battery system is mechanically refuelable through the replacement of fuel plates 30 within power modules 10 and is electrically rechargeable through the use and/or replacement of electrolyte solution that is distributed to power modules 10. By replacing eroded fuel plates 30 in power modules 10 with new fuel plates 30, stored energy is effectively restored within power modules 10. In one embodiment, the dissolved fuel plates 30 in the electrolyte solution within power modules 10 can undergo electroplating to bring the dissolved fuel back onto the eroded fuel plates 30. This process replaces the typical chemical reduction reaction that takes place in typical electrical battery recharging. In this case, the system is electrically driven, but has a mechanically resulting process that replenishes the fuel plates for further continuous use.

The hybrid solid fuel battery system is useful in a wide range of applications such as in any stationary or mobile application. Since it can be refueled or electrically recharged it could be used in an electric car that uses regenerative braking and requires long range and fast (minutes) refueling. As a low cost stationary product, 1, 3, or 5 kilowatt versions of the battery system are useful for off-grid power for agricultural uses, hydroponics power, cooking, lighting, HVAC applications, and the like. The hybrid solid fuel battery system is a generic power source that can be used to store solar energy and keep the energy stored for many years without loss of electrical power due to leakage current. As long as the fuel plates stay dry, the system will retain 100% of their stored energy.

It shall be appreciated that the components of the hybrid solid fuel battery system described in several embodiments herein may comprise any alternative known materials in the field and be of any color, size and/or dimensions. It shall be appreciated that the components of the hybrid solid fuel battery system described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A hybrid solid fuel battery system that is refuelable and electrically rechargeable, the battery system comprising:
    a power module comprising a module housing that stores a plurality of reactive fuel plates, a plurality of insulating separators and a plurality of cathode rings, the plurality of reactive fuel plates stacked together and electrically coupled together in parallel within the module housing, each reactive fuel plate in the plurality of reactive fuel plates being partially covered by a non-reactive layer to form an exposed bottom portion in the reactive fuel plate, each reactive fuel plate in the power module separated from an adjacent reactive fuel plate in the plurality of reactive fuel plates by one of the plurality of insulating separators, each cathode ring in the plurality of cathode rings secured around one of the plurality of reactive fuel plates within the module housing;
    a container operably connected to the power module by a first pipe;
    an electrolyte solution stored within the container; and
    a controller operably connected to the container;
    wherein the controller permits the electrolyte solution in the container to flow through the first pipe to the interior of the module housing to facilitate an interaction between the electrolyte solution and exposed bottom portions of the stacked reactive fuel plates in the power module, thereby generating electrical power.

2. The hybrid solid fuel battery system of claim 1, further comprising an air pump operably connected to the power module by a second pipe, the air pump operably connected to the controller, wherein the controller enables the air pump to generate air bubbles that flow through the second pipe to the interior of the module housing, the air bubbles within the module housing configured to agitate the electrolyte solution within the module housing to facilitate the interaction between the electrolyte solution and exposed bottom portions of the stacked reactive fuel plates in the power module.

3. The hybrid solid fuel battery system of claim 2, wherein each insulating separator in the plurality of insulating separators comprises a plurality of holes and a plurality of channels, the plurality of channels in the insulating separator configured to direct the electrolyte solution within the module housing to the plurality of holes and entirely through the insulating separator.

4. The hybrid solid fuel battery system of claim 3, further comprising a bolt and a nut coupled to the plurality of reactive fuel plates, the bolt extending along a longitudinal axis of the module housing and configured to electrically couple the plurality of reactive fuel plates together.

5. The hybrid solid fuel battery system of claim 4, wherein the electrolyte solution is an approximately 3% peroxide and potassium hydroxide mixture.

6. A hybrid solid fuel battery system that is refuelable and electrically rechargeable, the battery system comprising:
    a main housing;
    a plurality of power modules disposed in the main housing and electrically coupled to each other in series, each power module in the plurality of power modules comprising a module housing that stores a plurality of reactive fuel plates, a plurality of insulating separators and a plurality of cathode rings, the plurality of reactive fuel plates in the power module stacked together and electrically coupled together in parallel within the module housing, each reactive fuel plate in the plurality of reactive fuel plates in the power module being partially covered by a non-reactive layer to form an exposed bottom portion in the reactive fuel plate, each reactive fuel plate in the power module separated from an adjacent reactive fuel plate in the plurality of reactive fuel plates by one of the plurality of insulating separators, each cathode ring in the plurality of cathode rings secured around one of the plurality of reactive fuel plates within the module housing;
    a container operably connected to the plurality of power modules by a first set of pipes;
    an electrolyte solution stored within the container;
    an air pump operably connected to the plurality of power modules by a second set of pipes; and
    a controller operably connected to the container and air pump;
    wherein the controller permits the electrolyte solution in the container to flow through the first set of pipes to the interiors of the plurality of module housings in the plurality of power modules, wherein the controller enables the air pump to generate air bubbles that flow through the second set of pipes to the interiors of the plurality of module housings in the plurality of power modules, the air bubbles within each module housing in the plurality of power modules configured to agitate the electrolyte solution within the module housing to facilitate an interaction between the electrolyte solution and exposed bottom portions of the stacked reactive fuel plates in the power module, thereby generating electrical power.

7. The hybrid solid fuel battery system of claim 6, wherein each insulating separator in each module housing in the plurality of module housings comprises a plurality of holes and a plurality of channels, the plurality of channels in the insulating separator configured to direct the electrolyte solution within the module housing to the plurality of holes and entirely through the insulating separator.

8. The hybrid solid fuel battery system of claim 7, wherein the main housing comprises a drain reservoir beneath the plurality of power modules, the drain reservoir configured to collect the electrolyte solution that flows out of the plurality of module housings of the plurality of power modules.

9. The hybrid solid fuel battery system of claim 8, wherein each module housing in the plurality of power modules comprises a bolt and a nut coupled to the plurality of reactive fuel plates in the module housing, the bolt extending along a longitudinal axis of the module housing and configured to electrically couple the plurality of reactive fuel plates together.

10. The hybrid solid fuel battery system of claim 9, wherein the electrolyte solution is an approximately 3% peroxide and potassium hydroxide mixture.

\* \* \* \* \*